United States Patent [19]
Beck et al.

[11] Patent Number: 5,932,629
[45] Date of Patent: *Aug. 3, 1999

[54] ANION-BASED AQUEOUS PRINTING INKS WITH IMPROVED DEINKABILITY

[75] Inventors: Michael Beck; Herbert Fischer, both of Duesseldorf; Wolfgang Ritter, Haan; Ludwig Schieferstein, Ratingen; Udo Griebsch, Waldems-Bermbach; Quang-Minh Thai, Frankfurt, all of Germany

[73] Assignees: Henkel Kommanditgesellschaft auf Aktien, Duesseldorf, Germany; Hartmann Druckfarben, GmbH, Frankfurt, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/578,611
[22] PCT Filed: Jul. 7, 1994
[86] PCT No.: PCT/EP94/02229
  § 371 Date: Jan. 11, 1996
  § 102(e) Date: Jan. 11, 1996
[87] PCT Pub. No.: WO95/02017
  PCT Pub. Date: Jan. 19, 1995

[30] Foreign Application Priority Data

Jul. 9, 1993 [DE] Germany .............................. 43 22 999

[51] Int. Cl.⁶ .................................................. C09D 11/10
[52] U.S. Cl. .......................... 523/161; 524/376; 524/501; 524/522; 524/560; 524/561; 162/5
[58] Field of Search ................... 523/161; 260/DIG. 38; 524/501, 560, 561, 522, 376; 162/5

[56] References Cited

U.S. PATENT DOCUMENTS

| | | | |
|---|---|---|---|
| 4,454,279 | 6/1984 | Ong et al. | 527/376 |
| 4,567,099 | 1/1986 | Van Gilder et al. | 428/327 |
| 5,623,041 | 4/1997 | Boucher | 526/329.2 |

FOREIGN PATENT DOCUMENTS

| | | |
|---|---|---|
| 0065283 | 11/1982 | European Pat. Off. . |
| 0257567 | 3/1988 | European Pat. Off. . |
| 0466409 | 1/1992 | European Pat. Off. . |
| 4115731 | 11/1992 | Germany . |

OTHER PUBLICATIONS

W. Foerter et al., "Bestandsaufnahme der Deinkbarkeit von bedrucktem Altpapier" in Wochenblatt fuer Papierfabrikation 8, 1992, 281–285.

H.U. Suess et al., "Das Papier", 55th volume, No. 3, 1991, 89–96.

Primary Examiner—Marion McCamish
Assistant Examiner—John J. Guarriello
Attorney, Agent, or Firm—Ernest G. Szoke; Wayne C. Jaeschke; Real J. Grandmaison

[57] ABSTRACT

An aqueous printing ink composition containing finely dispersed pigments and a synthetic polymer binder, the binder containing: (a) finely dispersed, aqueous-basic insoluble emulsion (co)polymers having a number average molecular weight of from about 10,000 to 1,000,000 and a glass transition temperature of up to 0° C., in intimate admixture with (b) aqueous-basic soluble or dispersible (co) polymers having a number average molecular weight lower than that of the (co)polymers of component (a) and a glass transition temperature of at least 0° C.

18 Claims, No Drawings

ANION-BASED AQUEOUS PRINTING INKS WITH IMPROVED DEINKABILITY

BACKGROUND OF THE INVENTION

1. Field of the Invention

The present invention pertains to water-based printing inks, or aqueous inks, which are particularly suitable for flexographic and/or intaglio printing and exhibit improved deinkability. It is the object of the invention to provide printing inks of the type mentioned which may be classified as anion-based aqueous printing inks.

Reconditioning of printed waste paper by deinking is gaining increasing commercial importance. Deinking of waste paper by the flotation method is particularly important. In this connection, it is known that oil-based printing inks from newspapers, magazines, catalogs, telephone directories and the like are relatively easily deinked. It is further known, though, that prints consisting of aqueous flexographic and intaglio inks are poorly deinked by the flotation method if the printing inks or the binder systems employed are anion-based. Such binder systems and printing ink types, desirable as such for a number of reasons, will result in very small pigment particles upon deinking, particularly with the flotation method, and hence in unacceptable losses in whiteness of the printing substrate. In order to achieve sufficient deinking results, such waste paper prints had to be deinked by the so-called washing method. However, this method will result in high losses of fillers and short fibers, so the yield of recyclable paper mass will be less and the effluent contamination will be markedly higher than they are in the flotation method.

2. Discussion of Related Art

Technical publications, including the most recent ones, confirm the difficulties described herein. There may be mentioned the publication by W. Förster et al., "Bestandsaufnahme der Deinkbarkeit von bedrucktem Altpapier" in *Wochenblatt für Papierfabrikation* 8, 1992, 281–285. The authors confirm their results already achieved in former studies, i.e. that newspapers which have been prepared by flexographic printing using water-based flexographic printing inks will yield but very low deinkability figures, cf. supra, page 281, abstract, and page 284, relating to flexographically printed newspapers.

A similar statement is found in the publication by H. U. Süss et al., "Das Papier", 55th volume, No. 3, 1991, 89–96. It is set forth introductorily in the abstract that water-based printing inks are not separated by flotation in the conventional deinking process. To solve this problem, a two-step, alkaline-acidic flotation of printing inks which are hardly removed from waste paper has been proposed. In the acidic flotation step, quaternary amines having at least one long-chain alkyl residue, e.g. hexadecyltrimethylammonium chloride, are to be used as additives. Quaternary ammonium compounds of this type are known to exhibit significant drawbacks, especially in ecological terms. They have increased toxicity to fish and are hardly degradable.

To overcome the problems set forth hereinbefore, DE-A 1 41 15 731 has proposed deinkable aqueous inks the essential feature of which is the use of water-dilutable cationic resins as the binder component. Water-dilutable cationic acrylic resins in the form of a dispersion are preferably employed as binders. The examples of this latter reference include a comparative example in which a water-based printing ink comprising an anionic acrylic resin as the binder (printing substrate: newspaper) actually results in no measurable deinkability in the flotation method.

The teaching according to the invention proceeds from the object to provide anion-based systems and corresponding water-based printing inks which will give good printing results in practice, in particular in flexographic and/or intaglio printing, without problems and which nevertheless will give a printed matter which can be effectively deinked even in the flotation method and hence will result in high-quality secondary products.

DESCRIPTION OF THE INVENTION

Thus, in a first embodiment, the object of the invention are water-based printing inks for paper printing, in particular flexographic and/or intaglio printing, containing finely dispersed pigments and binders based on synthetic polymer compounds as well as conventional additives, if desired. In this embodiment, the teaching of the invention is characterized in that selected polymer mixtures of (1) finely dispersed, aqueous-basic insoluble emulsion (co)polymers (component 1) in intimate admixture with (2) aqueous-basic soluble and/or dispersible (co)polymer compounds with lower molecular weights than that of (1) (component 2)

are present as the binders for improving deinkability even in the flotation method involving waste paper printed with aqueous ink, said polymer components (1) and (2) being characterized by their glass transition temperatures ($T_g$) as follows: $T_g$ (1) is equal to or less than 0° C. and $T_g$ (2) is equal to or higher than 0° C., preferably higher than room temperature.

In a further embodiment, the present invention pertains to the use of the selected polymer mixtures of the above-mentioned components (1) and (2) as binders for water-based printing inks containing finely divided pigments, especially carbon black, which will result in printed waste papers which are readily deinkable even in the flotation method.

DETAILED DESCRIPTION OF THE INVENTION

The present invention proceeds from the realization that the selection of particular binder types, known per se in terms of individual examples, for the preparation of water-based printing inks may lead to a technical solution of the problem of the invention. The water-based printing inks which are now used for the preparation of prints yielding waste-papers that are effectively deinked even in the one-step flotation method are characterized by the selection and combination of the polymer mixtures forming the binder.

According to the invention, two resin or polymer types are used in intimate admixture which are distinct by a number of parameters. The first component (1) consists of finely dispersed, aqueous-basic insoluble emulsion (co)polymers characterized by low glass transition temperatures (referred to as "$T_g$" in the following). $T_g$ (1) is at or below 0° C. As the component (1), corresponding emulsion (co)polymer compounds having $T_g$ values of -10° C. or below are preferred, corresponding polymer compounds having significantly lower $T_g$ values being of particular importance. Comparative experiments have shown that deinkability of the printed waste paper, expressed as the deinkability figure, DEF-%, can become the better, the lower $T_g$ (1) is chosen. Thus, in coordination with the other parameters of the invention, increasingly better deinking results can be achieved if emulsion (co)polymers with decreasing $T_g$ values are employed as the binder component (1), wherein steps of, for example, −20° C., −25° C., −30° C., and −35° C., down to −40° C. may be mentioned. Optimum deinking results could be achieved, for instance, when employing aqueous inks according to the invention the polymer components (1) of which have $T_g$ values ranging from −30 to −35° C.

However, the components (2) which are characterized by being aqueous-basic soluble and/or dispersible polymer compounds (also referred to as solid resins in the following) and having a lower molecular weight than that of (1) are integral parts of the binder system of the aqueous inks according to the invention. Their glass transition temperature $T_g$ (2) is basically distinct from the $T_g$ of (1). As a lower limit for $T_g$ (2), 0° C. and in particular room temperature or above is required according to the invention. Preferably, $T_g$ (2) is ranging at significantly higher values, especially at least 35° C., preferably 40 to 50° C. or above. Particularly interesting examples of this component (2) can have $T_g$ (2) values ranging up to about 150° C. and even above, if desired.

The teaching of the invention comprises the use of admixtures of two or more characteristic examples of the respective group of materials, both in the case of the water-insoluble emulsion (co)polymer component (1) and particularly in the case of component (2), in the binder composition of the aqueous printing inks according to the invention.

Apparently, the combination, according to the invention, of the two binder components (1) and (2) described herein enables the technical solution of the various problems of the invention. The following may be said without claiming completeness:

First, the aqueous printing ink must obviously be designed such that it will meet the high technical requirements involved in its use, for example, in printing newspapers or magazines. The appearance and the drying characteristics of the printed image as well as a trouble-free operation of the printing device must be ensured with the high printing rates given. In particular, no troubles with the printing rollers must arise, for instance, from residual printing ink adhering thereto. It is known that special requirements are to be met for paper printing which is run with high operation speeds. The problems of the subsequent deinking process derived from such requirements, especially in the flotation method, are known from and set forth in detail in the prior art mentioned, in particular the publication by H. U. Süss et al., supra. The remedy described therein for overcoming those problems involves a two-step flotation, a multi-stage deinking process being suggested for solving those problems.

Through the combination, according to the invention, of the binder components (1) and (2) defined above in the water-based printing ink system and through the interaction of this binder system with the finely divided, finely dispersed pigments used in said printing inks, it becomes possible for the first time to meet in their entirety the different parameter requirements which are contradicting in some way. The performance of such optimized water-anion-based binder systems reaches that of the cation-based deinkable aqueous inks of the reference mentioned above; improved deinking results in waste paper reconditioning of highly aged printed matters may even be obtained with trouble-free use as a printing ink.

The mixing ratios of components (1) and (2) in the polymeric binder composition according to the invention may be varied in a relatively wide range. Naturally, optimization of the respective mixing ratios for the respective selected type of resin, with respect to both the water-insoluble component (1) and the water-soluble or water-dispersible component (2), considering their interaction is possible and usually necessary. Generally, a range of from 9:1 to 1:2 may be suitable for the mixing ratio of components (1) to components (2). Preferably, mixing ratios in the range of from about 4:1 to 1:1.5 are used while it may be particularly convenient to use mixing ratios in the range of from 3:1 to 1:1. It can be seen from those ranges that the emulsion (co)polymer (1) with its low $T_g$ values generally represents the prevailing polymer component in the binder composition employed according to the invention, although ratios involving about equal amounts of components (1) and (2) also fall in preferred ranges. In particular cases, however, according to the figures specified above, the relatively hard component (2) may also be the prevailing component of the binder composition.

Polymeric binder compositions for the use according to the invention and aqueous formulations thereof may be obtained in a particularly easy way by means of a process which is of commercial large-scale importance today. In this connection, reference may be made, for instance, to EP A2 0 257 567 which describes the per se known preparation of emulsion copolymers which is modified, however, such that for a substantial period of time emulsion (co)polymerization takes place in the presence of aqueous-basic soluble or dispersible polymer components as stabilizing aids for the aqueous-basic insoluble emulsion (co)polymer formed. With respect to the invention, such technology may be used in such terms that the polymeric binder composition of the printing inks described according to the invention is the reaction product of the emulsion (co)polymerization performed with the addition of emulsion-stabilizing components (2) to give the water-insoluble polymer (1). If desired, further proportions of polymer components (1) and/or (2) may be added to the aqueous-basic based reaction product following completion of the above process step. This may involve the use of equal or different proportions of polymers (1) and/or (2) with respect to the polymer compounds of the first process step. In this context, water-based printing inks the component (2) of which has been worked into the aqueous ink in multiple steps may be of particular importance.

Through the selection and determination of, on one hand, the water-insoluble emulsion (co)polymers (1) formed and, on the other hand, the components (2) assisting the formation of and stabilizing the emulsion, the teaching according to the invention enables the realization of the compromise required with respect to the numerous material properties, in part contradicting each other, of the binder system of the printing inks according to the invention. The following will be set forth relating to the polymer components (1) and (2) without claiming completeness:

Usually, the water-insoluble emulsion (co)polymers (1) have average molecular weights (number average $M_n$) in the range of from about $10^4$ to $10^6$. The range of from about $5\times10^4$ to $5\times10^5$ may be of particular importance. As the starting monomers or monomer mixtures for the preparation of this binder component, the preferred embodiment at least predominantly uses such monomer types which will result in the low $T_g$ values required herein. Presumably, this material characteristic imparts the capability to the binder system according to the invention of entering into so intimate a contact with the finely divided, finely dispersed pigments in printing and possibly also in reconditioning of the waste paper in the course of the deinking step that sufficient aggregation exists and remains ensured between pigment particles and resin particles in deinking of the waste paper and thus flotation only becomes possible at all. As important monomer components for the preparation of such component(s) (1), there may be mentioned in particular esters of olefinically unsaturated carboxylic acids, especially of corresponding lower α,β-unsaturated carboxylic acids, with straight and/or branched chain alcohols of higher chain lengths. Particularly suitable olefinically unsaturated carboxylic acids are acrylic and/or methacrylic acids, or dicarboxylic acids, such as maleic acid or maleic anhydride and/or fumaric acid. Suitable alcohols contain, for instance, up to 20 carbon atoms and in particular from 3 to 15 carbon atoms. Particularly important examples of such esterforming alcohols are straight and/or branched chain monohydric alcohols containing from 4 to 10 carbon atoms. The polymer component can be in the form of selected homopolymers, but preferably in the form of copolymers. When n-butyl acrylate, i-butyl acrylate and/or 2-ethylhexyl acrylate are used, for instance, the desired lower $T_g$ values in the range of, for instance, −20 to −35° C. can be adjusted in the (co)polymer formed. The concomitant use of minor amounts of comonomers which as such will result in relatively high $T_g$ values in the copolymer formed is possible and may even be preferred. The control of undesirable adhesiveness may thus be achieved, for instance.

In the most important embodiments, the aqueous-basic soluble components (2) stabilizing the emulsion state are characterized by average molecular weights (number average $M_n$) in the range of from about 500 to 20,000 and preferably in the range of from about 1,000 to 10,000. Particularly important solid resins of this kind have respective average molecular weights in the range of from about 1,000 to 6,000.

The selection of the monomers or monomer mixtures for the preparation of those soluble/dispersible components is determined by the higher $T_g$ values required for this component. In addition, sufficient solubility of this polymer component under aqueous-basic conditions is to be ensured. By a suitable per se known selection of the monomers or monomer mixtures for this component, considerable control of the material properties of this binder component is possible. Useful olefinically unsaturated acids are in particular corresponding lower α,β-olefinically unsaturated acids, such as acrylic and/or methacrylic acids, but again also corresponding olefinically unsaturated dicarboxylic acids, especially maleic acid or maleic anhydride and/or fumaric acid. As comonomers, compounds are used of a type known to result in the desired high $T_g$ values in the polymer state, particularly in the range of from about 40 to 150° C. Examples thereof are the alkyl esters, already mentioned, of lower acids of the type (meth)acrylic acid, but also, in particular, monovinylidene aromatics, such as styrene and styrene derivatives, for example, α-methylstyrene. Examples of suitable alkyl esters are the corresponding methyl esters, but the concomitant use of other alcohol residues is also possible with appropriate control of the $T_g$ values. Thus, for instance, with the concomitant use of 2-ethylhexyl acrylate as a comonomer, solid resins having $T_g$ values in the range of from 35 to 60° C. can also be prepared from such component (2).

Thus, the preparation of the water-based binder systems for the printing inks according to the invention is conveniently performed such that the components (2) are prepared in a separate step and dissolved-with a water-soluble base, e.g. ammonia. Then, the emulsion (co)polymerization of the monomers or monomer mixtures of component (1) is performed during at least part of the period of the emulsion (co)polymerization in the aqueous-basic solution of the solid resin (2). For details, reference is made again to the already mentioned EP-A2 0 257 567.

The deinkable printing ink of the invention further contains in aqueous formulation, in addition to the binder system defined according to the invention, inorganic and/or organic pigments as well as optionally further common auxiliary agents and additives, for instance, limited amounts of organic solvents and/or additives from the preparation of suspensions or emulsions. Suitable compositions of the aqueous ink are within the following range, for instance:

From about 5 to 30% by weight, preferably from about 10 to 20% by weight, of one or more finely dispersed inorganic or organic pigments. Of particular importance is fine-particle carbon black. Examinations have shown that the special structure of the carbon black employed is of minor importance. Carbon black pigments having high structures are deinkable, in principle, in much the same way as corresponding pigments having low structures. In addition to the pigments employed for brightening carbon blacks, other commercial colored pigments may also be used. Reference is made to the statements of the above-mentioned DE 41 15 731;

from about 5 to 30% by weight (solids), preferably from about 10 to 25% by weight, of the binder system according to the invention consisting of the polymer components (1) and (2) with their different $T_g$ values;

from about 40 to 90% by weight of water, preferably at least about 50% by weight, and particularly from about 50 to 80% by weight of water;

from 0 to about 25% by weight of one or more organic solvents, and from 0 to 10% by weight of other additives, for example, emulsifiers, solubilizing agents and the like. As for the rest, reference is made here also to the additives in conventional aqueous inks for paper printing stated in DE 41 15 731. There are mentioned, for instance, commercial polyethylene waxes, defoaming agents, film forming aids, mineral fillers, dispersing agents, surfactants, neutralizing agents, and the like.

In the following examples, the deinking results are expressed by the deinkability figure, DEF-%. This figure is calculated from the reflection coefficients $R_{457nm}$ (whiteness) of the printed (PM), deinked (DM), and unprinted (UM) paper materials according to the following formula:

$$DEF\ (\%) = \frac{\text{whiteness (DM)} - \text{whiteness (PM)}}{\text{whiteness (UM)} - \text{whiteness (PM)}} \times 100$$

(0% means no removal of printing inks, 100% means quantitative removal of printing inks)

The test for evaluating the deinkability was performed according to the "PTS-Methode 010/87" (Papiertechnische Stiftung München 1987), for details see the above-mentioned publication by W. Förster et al., "Bestandsaufnahme der Deinkbarkeit von bedrucktem Altpapier" in *Wochenblatt für Papierfabrikation* 8, 1992 and the reference 2 therein (page 285).

The following statements refer to the determination of the glass transition temperatures from the following examples:

The glass transition temperatures of the polymers were determined with the DSC determination device PL DSC Model 12000 of PL Thermal Sciences by power differential measurement in a dynamic process with a heating rate of 20 degrees/minute (control via the interface CCl 3, Model F 1343, and evaluation on a personal computer using Plus V Software, version 5.20, of the same company).

The protocols followed were those of DIN 51006, "Thermische Analyse", and DIN 53765, "Thermische Analyse von Polymeren", in which the conditions of equipment as well as details of sample, inert gas and apparatus preparation are described.

The glass transition always takes place over a more or less wide range of temperatures (e.g. between −20° C. and −30° C.). The temperature of the so-called half-height is stated as the glass transition temperature $T_g$. In the graphical representation of the dependance of heating power on temperature, the baseline before and after the glass transition is extended. Then, the glass transition temperature $T_g$ is the abscissa value of that point of the curve the ordinate value of which is at an equal distance from the upper and lower baseline extensions.

For a safe determination of the glass transition temperature, several measurements and runs are usually required.

With the redispersible resins examined and stated in the following examples part, a lower $T_g$ value ($T_g$ (1)) and an elevated $T_g$ value ($T_g$ (2)) are determined as a rule. A special case is the commercial product of one of the Applicants, G-Cryl 2000, with respect to $T_g$ (2). Here, two temperature values above 0° C. are determined for $T_g$ (2) in addition to the lower value for $T_g$ (1). In the case of the anionic redispersible resin, Joncryl 90 (Johnson), used by way of comparison, no value for $T_g$ (1) could be determined.

EXAMPLES

The preparation of the aqueous printing inks is performed according to the prior art by preparing a finished printing ink via highly concentrated pigment concentrates by paint formulating with binders and diluting with water or on a direct route.

As coloring components, both carbon blacks, such as Printex 140 U, Printex 25, 350, 550 (Degussa), and organic or inorganic colored pigments may be employed.

Dispersing is performed in the usual way for the preparation of printing inks using mixers, cylinder mills, or bead mills. Under certain circumstances, such as when pigment press cakes are used, for instance, it can be omitted.

As additives, anionic or non-ionic surfactants (e.g. Arkopal N90, Hoechst), wetting and antifoaming agents (Surfynol 104, Air Products), defoamers (Byk 80, Bykchemie, or Tego Foamex 81/1488/1435, Tego), commercial waxes (Vestowax A 616 SF, Hüls), and fillers, such as calcium carbonate, silicates or titanium dioxide, may be used.

EXAMPLES 1 to 3 (according to the invention)

In the following, only the formulations of the respective printing inks are given at first, the figures adding to 100 representing weight parts.

Example 1

| | | |
|---|---|---|
| G-Cryl 2000 | 53.8 | anionic dispersion (Henkel) |
| Printex 550 | 16.0 | |
| Surfynol 104 | 0.5 | |
| Tego Foamex 1488 | 0.5 | |
| Water | 29.2 | |
| | 100.0 | |

Example 2

| | | |
|---|---|---|
| Joncryl 80 | 53.0 | anionic dispersion (Johnson) |
| Printex 140 U | 16.0 | |
| Surfynol 104 | 0.5 | |
| Tego Foamex 1488 | 0.5 | |
| Water | 30.0 | |
| | 100.0 | |

Example 3

| | | |
|---|---|---|
| G-Cryl 1200 | 53.0 | anionic dispersion (Henkel) |
| Printex 140 U | 16.0 | |
| Surfynol 104 | 0.5 | |
| Tego Foamex 1488 | 0.5 | |
| Water | 30.0 | |
| | 100.0 | |

Comparative Examples 4 and 5

Example 4

| | | |
|---|---|---|
| Joncryl 90 | 57.5 | anionic acrylate dispersion (Johnson) |
| Printex 350 | 16.0 | |
| Tego Foamex 81 | 0.2 | |
| Surfynol 104 | 1.0 | (Air Products) |
| Water | 25.3 | |
| | 100.0 | |

Example 5

For the preparation of the printing ink, a varnish is first prepared according to the following formulation:

| | | |
|---|---|---|
| Water | 57.4 | |
| Joncryl 679 | 35.0 | anionic dispersion (Johnson) |
| NH$_3$ (aqueous 35%) | 7.5 | |
| Tego Foamex 81 | 0.1 | |
| | 100.0 | |

Using this varnish, a printing ink is prepared according to the following formulation:

| | |
|---|---|
| varnish | 35.1 |
| Printex 140 U | 16.0 |
| Water | 48.8 |
| Tego Foamex 1488 | 0.1 |
| | 100.0 |

With the printing inks of examples 1–3 according to the invention and comparative examples 4 and 5, newspaper is printed as the printing substrate. The results obtained in deinking, DEF (%) and DM (%), are summarized in the following table and related to the values of $T_g$ (1) and $T_g$ (2) determined on the respective type of binder. Table 1 shows that examples 1 to 3 according to the invention yield high deinkability figures (DEF-%). The types of comparative examples 4 and 5 whose binder properties do not correspond to the definition according to the invention yield significantly poorer deinking results.

TABLE 1

| Ex. | Polymer | Pigment | DEF, (%) | DM (%) | $T_g$ (1), °C. | $T_g$ (2), °C. |
|---|---|---|---|---|---|---|
| 1 | G-Cryl 2000 | Printex 550 | 80.9 | 57.7 | −35 | 65; 150 |
| 2 | Joncryl 180 | Printex 140 U | 81.9 | 59.1 | −30 | 150 |
| 3 | G-Cryl 1200 | Printex 140 U | 79.3 | 57.4 | −35 | 140 |
| 4 | Joncryl 90 | Printex 350 | 39.4 | 42.6 | * | 110 |
| 5 | Joncryl 679 | Printex 140 U | 37.3 | 43.5 | 70 | 140 |

* = no value could be determined

In further studies, printing inks according to the above statements have been prepared using the following polymeric binders: Joncryl 8051 (Johnson), Lucidene 141, Lucidene 605 and Lucidene 610 (anionic redispersible resins, Morton).

The following table 2 summarizes the polymer types, the deinkability figures and the values for $T_g$ (1) and $T_g$ (2):

TABLE 2

| Polymer | DEF (%) | $T_g$ (1), °C. | $T_g$ (2), °C. |
|---|---|---|---|
| Joncryl 8051 | 70.5 | −30 | 135 |
| Lucidene 605 | 81 | −25 | 145 |
| Lucidene 610 | 68 | −5 | 150 |
| Lucidene 141 | 55 | * | 100 |

* = no value could be determined

In another series of experiments, the anionic redispersible resin, G-Cryl 2000 (Henkel), used in example 1 is modified in that the aqueous-basic soluble or dispersible component (2) is replaced by corresponding solid resin components having lower $T_g$ (2) values whereas the aqueous-basic insoluble resin component (1) is retained.

The solid resins used herein as the resin component (2) are styrene/α-methylstyrene/acrylic acid/2-ethylhexyl acrylate based copolymers having the following $T_g$ (2) values: "solid resin A", $T_g$ (2)=65° C.; "solid resin B", $T_g$ (2)=40° C. The following table 3 summarizes the polymer types, the deinkability figures and the values for $T_g$ (1) and $T_g$ (2).

TABLE 3

| polymer based on | DEF (%) | $T_g$ (1), °C. | $T_g$ (2), °C. |
|---|---|---|---|
| solid resin A | 93.0 | 140–150 | 65 |
| solid resin B | 96.9 | 140–150 | 40 |

It is interesting to note that in the visual evaluation of the deinked material in the two latter instances, a slight yellow cast results despite the addition of bleaching agent which is generally the case with colors that are readily deinked.

We claim:

1. An aqueous flexographic or intaglio paper printing ink composition deinkable from waste paper by the flotation method comprising inorganic or organic colored pigments and a synthetic anionic polymer binder for said pigments, said binder consisting essentially of:

(a) dispersed, aqueous-basic insoluble emulsion (co)polymers having a number average molecular weight of from about 10,000 to 1,000,000 and a glass transition temperature of less than 0° C., in admixture with (b) aqueous-basic soluble or dispersible (co)polymers having a number average molecular weight lower than that of the (co)polymers (a) and a glass transition temperature of at least 0° C., said (co)polymers (a) and (b) being present in a weight ratio of from 9:1 to 1:2.

2. The composition of claim 1 wherein said (co)polymers (a) have a glass transition temperature of less then −10° C.

3. The composition of claim 1 wherein said (co)polymers (a) have a glass transition temperature of from −25° C. to −30° C.

4. The composition of claim 1 wherein said (co)polymers (b) have a glass transition temperature of at least room temperature.

5. The composition of claim 1 wherein said (co)polymers (b) have a number average molecular weight of from 1,000 to 10,000.

6. The composition of claim 1 wherein said (co)polymers (b) have a number average molecular weight of from 1,000 to 6,000.

7. The composition of claim 1 containing from 5 to 25% by weight of said pigments and from 5 to 25% by weight of said binder, all weights being based on the weight of said ink composition.

8. The composition of claim 1 wherein said (co)polymers (a) comprise esters of olefinically unsaturated lower carboxylic acid and straight or branched chain alcohols containing from 3 to 15 carbon atoms.

9. The composition of claim 1 wherein said (co)polymers (b) are selected from the group consisting of styrene, lower esters of lower olefinically unsaturated carboxylic acids, and mixtures thereof.

10. A process for enhancing the deinkability of an aqueous flexographic or intaglio paper printing ink composition by the flotation method wherein said composition contains inorganic or organic colored pigments comprising adding a synthetic anionic polymer binder to said printing ink composition, said binder consisting essentially of:

(a) dispersed, aqueous-basic insoluble emulsion (co)polymers having a number average molecular weight of from about 10,000 to 1,000,000 and a glass transition temperature of less than 0° C., in admixture with (b) aqueous-basic soluble or dispersible (co) polymers having a number average molecular weight lower than that of the (co)polymers (a) and a glass transition temperature of at least 0° C., said (co)polymers (a) and (b) being present in a weight ratio of from 9:1 to 1:2.

11. The process of claim 10 wherein said (co)polymers (a) have a glass transition temperature of up to −10° C.

12. The process of claim 10 wherein said (co)polymers (a) have a glass transition temperature of from −25° C. to −30° C.

13. The process of claim 10 wherein said (co)polymers (b) have a glass transition temperature of at least room temperature.

14. The process of claim 10 wherein said (co)polymers (b) have a number average molecular weight of from 1,000 to 10,000.

15. The process of claim 10 wherein paid (co)polymers (b) have a number average molecular weight of from 1,000 to 6,000.

16. The process of claim 10 wherein said ink composition contains from 5 to 25% by weight of said pigments and from 5 to 25% by weight of said binder, all weights being based on the weight of said ink composition.

17. The process of claim 10 wherein said (co)polymers (a) comprise esters of olefinically unsaturated lower carboxylic acid and straight or branched chain alcohols containing from 3 to 15 carbon atoms.

18. The process of claim 10 wherein aid (co)polymers (b) are selected from the group consisting of styrene, lower esters of lower olefinically unsaturated carboxylic acids, and mixtures thereof.

* * * * *